United States Patent [19]

Tyrpin et al.

[11] Patent Number: 5,494,685
[45] Date of Patent: Feb. 27, 1996

[54] CHEWING GUM WITH A ROLLING COMPOUND CONTAINING ERYTHRITOL

[75] Inventors: Henry T. Tyrpin, Midlothian; Kevin B. Broderick, Berwyn; Robert J. Yatka, Orland Park, all of Ill.

[73] Assignee: Wm. Wrigley Jr. Company, Chicago, Ill.

[21] Appl. No.: 245,202

[22] Filed: May 17, 1994

[63] Continuation in part of PCT/US93/09354, Sep. 30, 1993.
[51] Int. Cl.$^6$ ..................................... A23G 3/30
[52] U.S. Cl. ................... 426/5; 426/548; 426/658
[58] Field of Search .................... 426/3–6, 548, 426/658

[56] References Cited

U.S. PATENT DOCUMENTS

| | | | |
|---|---|---|---|
| 3,899,593 | 8/1975 | Hammond et al. | 426/3 |
| 4,065,578 | 12/1977 | Reggio et al. | 426/3 |
| 4,382,963 | 5/1983 | Klose et al. | 426/3 |
| 4,902,525 | 2/1990 | Kondou | 426/548 |
| 4,931,294 | 6/1990 | Yatka et al. | 426/3 |
| 4,933,188 | 6/1990 | Cherukuri et al. | 426/3 |
| 4,976,972 | 12/1990 | Patel et al. | 426/3 |
| 5,080,916 | 1/1992 | Kondou | 426/548 |
| 5,120,550 | 6/1992 | Van der Schueren | 426/3 |
| 5,156,866 | 10/1992 | Sato et al. | 426/5 |
| 5,206,042 | 4/1993 | Dave et al. | 426/5 |

FOREIGN PATENT DOCUMENTS

| | | |
|---|---|---|
| 0009325A1 | 4/1980 | European Pat. Off. |
| 0325790A2 | 8/1989 | European Pat. Off. |
| 0497439A1 | 8/1992 | European Pat. Off. |
| 0511761A1 | 11/1992 | European Pat. Off. |
| 0530995A1 | 3/1993 | European Pat. Off. |
| 56-18180 | 4/1981 | Japan. |
| 1-51045 | 2/1989 | Japan. |
| 1-225458 | 9/1989 | Japan. |
| 2-104259 | 4/1990 | Japan. |
| 4-287659 | 10/1992 | Japan. |
| 4-287658 | 10/1992 | Japan. |
| 5-137535 | 6/1993 | Japan. |
| WO93/00828 | 1/1993 | WIPO. |

*Primary Examiner*—Jeanette Hunter
*Attorney, Agent, or Firm*—Steven P. Shurtz; Willian Brinks Hofer Gilson & Lione

[57] ABSTRACT

A chewing gum product is provided with a rolling compound containing erythritol and an anticaking agent, such as talc. The angle of repose of the rolling compound is less than 30°. Preferably the rolling compound comprises about 40% to about 95% erythritol, about 0.5% to about 10% anticaking agent and about 4.5% to about 50% of another polyol selected from the group consisting of maltitol, lactitol, mannitol and xylitol.

20 Claims, 3 Drawing Sheets

CHEWING GUM WITH A ROLLING COMPOUND CONTAINING ERYTHRITOL

CROSS REFERENCE TO RELATED APPLICATION

The present application is a continuation-in-part of PCT application Ser. No. 93/09354 filed Sep. 30, 1993, designating the United States, which is hereby incorporated by reference.

BACKGROUND OF THE INVENTION

This invention relates to chewing gum. More particularly it relates to chewing gum products (especially sugarless chewing gum products) with an improved rolling compound thereon, and methods of making such products.

For many years it has been known to dust products such as chewing gum with materials such as powdered sugar to improve appearance and initial taste. The dusting also is intended to prevent the chewing gum from sticking to the fingers when handled, or to the wrapper when the product is unwrapped. The material used to dust chewing gum is known as a dusting compound; or, because its primary function in gum is to make the gum more manageable during processing, including rolling, as a rolling compound.

Conventional known rolling compounds include sucrose, sorbitol, starch, calcium carbonate and talc. Sucrose is a sugar, and by definition, cannot be used in a sugarless gum. Mannitol is today the most common sugarless rolling compound, but it does not enhance initial sweetness of the chewing gum. Sorbitol can cause a burning sensation in the throat. Starch can give a dry mouth feel and can cause embrittlement of the gum by drawing water out of the gum stick. Calcium carbonate and talc likewise do not enhance taste.

U.S. Pat. No. 4,976,972 discloses a chewing gum composition with improved sweetness employing a xylitol rolling compound.

U.S. Pat. No. 5,206,042 discloses a blend of mannitol and sorbitol used as a rolling compound. The sorbitol is ground to a fine powder so that its particle size distribution is similar to that of the mannitol. This was found to improve the flow properties of the rolling compound. The flowability, measured as the angle of repose, was found to be equal to or better than the angle of repose of a rolling compound comprising 93% mannitol and 7% talc.

Erythritol is a sugar alcohol that has similar cooling properties as those found in mannitol and xylitol. Because of its low hygroscopicity, it is a good candidate for a rolling compound for sugarless gum. Its application to the surface of sugarless gum could slow down or even prevent sweating and blocking found in sugarless products.

Erythritol has been used previously in chewing gum products.

U.S. Pat. No. 5,120,550 discloses a chewing gum made with a sweetening agent containing erythritol and a liquid sugar alcohol.

Low calorie sweetening compositions containing meso-erythritol are disclosed in U.S. Pat. No. 5,080,916 and No. 4,902,525, EPO Patent Publication No. 0 325 790, and Japanese Patent Publications No. 89-225458 and No. 90-104259.

Japanese Patent No. 89-51045 discloses chewing gum made with a melted mixture of meso-erythritol and sugars or sugar alcohols.

EPO Patent Publication No. 0 497 439 discloses a sweetener employing the use of spray dried erythritol.

EPO Patent Publication No. 0 511 761 discloses a sweetening composition made up of erythritol, sorbitol, and a glucose oligomer.

PCT Publication No. W093/00828 discloses a stabilized dipeptide sweetening composition which is useful in chewing gum and may contain erythritol.

Other patents and publications which discuss erythritol include U.S. Pat. No. 4,382,963 and No. 5,156,866 (erythritol in chewing gum); Japanese Patent Publications No. 92-287658 and No. 92-287659, both published Oct. 13, 1992, (sweetening compositions containing meso-erythritol); Japanese Patent Publication No. 93-137535 published Jun. 1, 1993, (free flowing sweetener containing erythritol) and European Patent Publication No. 0 530 995, published Mar. 10, 1993, (lozenge containing sweetener which is all or partly erythritol or maltitol).

EPO Patent Publication No. 0 009 325 and Japanese Patent Publication No. 81-18180 disclose a method of reducing dental caries with a sugarless chewing gum made with erythritol. Example VIII of these equivalent EPO and Japanese applications dust the example chewing gum composition with erythritol powder.

Erythritol by itself and in its commercially available form, however, has been found lacking when used as a rolling compound for commercial applications. One problem is that a rolling compound has to have certain characteristics such as flowability. A rolling compound for commercial use should have a flowability, measured by its angle of repose, of 30° or less. Erythritol in its normal form was found to not be suitable in this regard. Thus it would be a great advantage if erythritol could be used as a rolling compound for chewing gum products by giving the erythritol improved flow properties.

SUMMARY OF THE INVENTION

It has been discovered that erythritol can be used as a rolling compound if it is first mixed with an anticaking agent to improve its flowability. In that regard, in a first aspect the invention is a chewing gum product having a core portion comprising chewable gum base, sweetener and flavoring and further having on the surface of the core portion a powdered rolling compound comprising erythritol and an anticaking agent.

In a second aspect, the invention is a method of producing a chewing gum product comprising the steps of (a) producing a chewing gum composition comprising chewable gum base, sweetener and flavoring; (b) providing a rolling compound comprising erythritol and an anticaking agent; and (c) shaping portions of the chewing gum composition into gum pieces while using the rolling compound to coat the surface of the gum pieces.

In a third aspect, the invention is a chewing gum product having a core portion comprising chewable gum base, sweetener and flavoring and further having on the surface of the core portion a powdered rolling compound comprising erythritol treated so that the rolling compound has an angle of repose of about 30° or less.

By modifying the erythritol to change its angle of repose to be 30° or less, it has now been possible to make chewing gum products with a rolling compound comprising erythritol using commercial gum manufacturing equipment.

DETAILED DESCRIPTION OF THE INVENTION AND PREFERRED EMBODIMENTS

All percentages herein are weight percentages unless otherwise specified. The term "chewing gum" also includes bubble gum and the like.

Erythritol is a tetrahydric polyol or sugar alcohol, having the empirical formula $C_4H_{10}O_4$ and the structural formula $CH_2COH-CHOH-CHOH-CH_2OH$. It can be obtained by fermenting glucose with specially selected yeast strains in appropriate aqueous nutrient media, or by treating an aqueous alkali carbonate solution of 2-buten-1,4-diol with chlorine, and saponifying the resulting chlorohydrin. Erythritol is available from Mitsubishi Kasei America, Inc., 81 Main St., White Plains, N.Y. 10601; and from Mitsubishi Kasei Corp., outside the United States. As supplied by Mitsubishi, erythritol is a powder with a melting point of about 119° C. It has a sweetness level of about 75% of that of sucrose, and has good storage stability. Its solubility in water at room temperature is 40%. Erythritol is not approved for use in human food products or chewing gum in the United States. A GRAS affirmation petition for erythritol as a human food ingredient is being prepared by Mitsubishi Kasei Corp. Erythritol does not contribute to dental caries, does not cause gastric distress, and does not contribute significantly to caloric intake, giving a highly acceptable gum product.

Rolling compounds are normally in the form of a powder. In order for a powder to be considered as a rolling compound, it has to have certain characteristics such as flowability. The angle of repose is a characteristic commonly used by design engineers to determine flowability of powders before fabricating storage tanks, bins, hoppers and feeders for dry powders.

Figure 1:
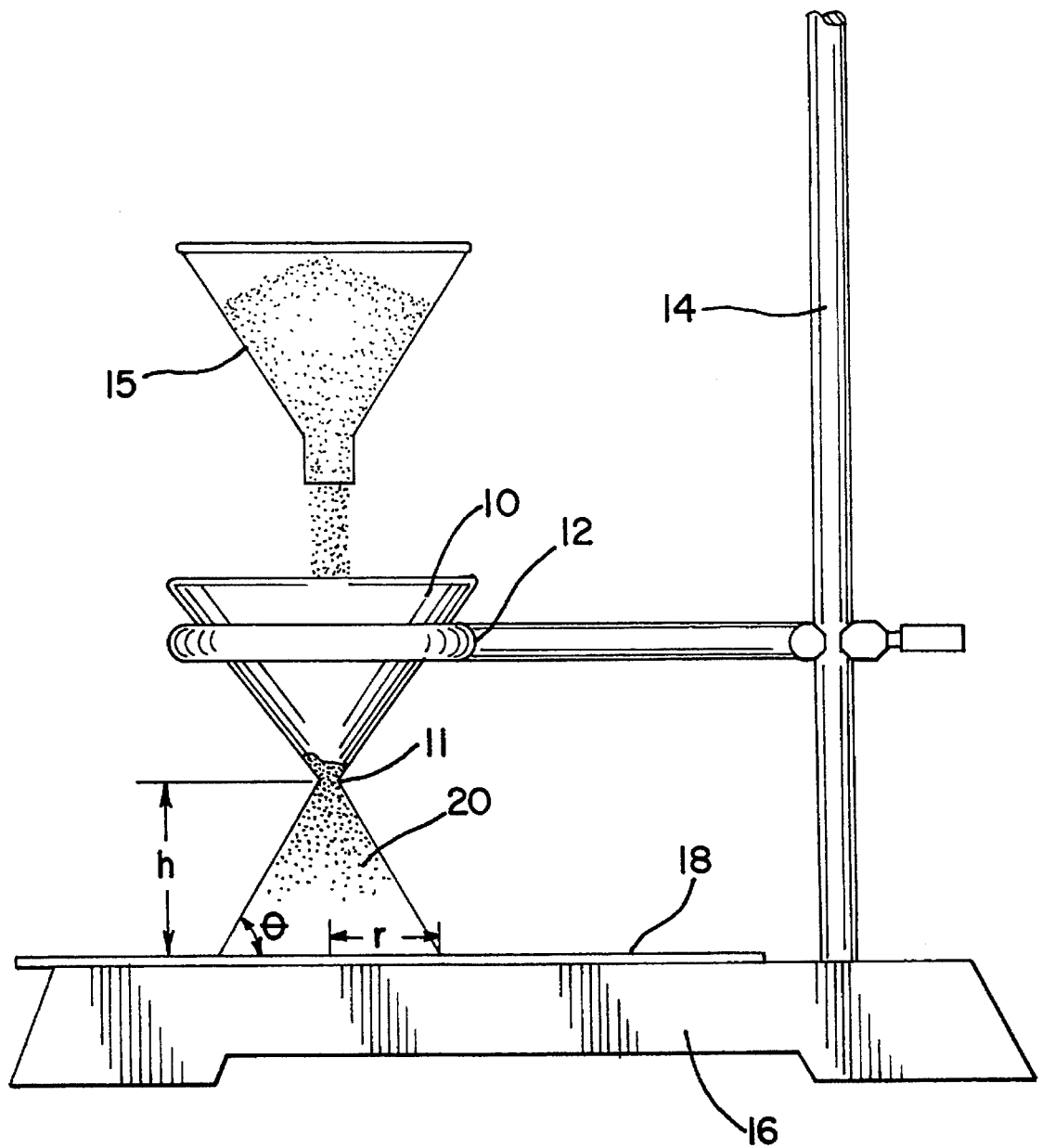
FIG. 1 is a schematic representation of the apparatus used to determine the angle of repose for the results reported herein.

FIG. 1 shows an apparatus for measuring the angle of repose of a rolling compound. A cone funnel 10 with no stem is mounted to a funnel ring holder 12 which is fastened to a laboratory stand including a vertical arm 14 and a horizontal support platform 16. A piece of notebook paper 18 is positioned on the platform 16 beneath the lower opening 11 in the funnel 10. The funnel 10 is mounted such that the lower opening 11 is about one inch above the paper 18.

The funnel 10 can be a standard conical-shaped laboratory funnel constructed of plastic. The lower opening 11 in the funnel has a diameter of about 2.5 cm. The funnel 10 has a top diameter of 10 cm.

In order to measure the angle of repose, the rolling compound is slowly introduced into the funnel 10. The rolling compound is preferably introduced into funnel 10 from a powder funnel 15 with a stem. The bottom of the stem should be about one-half inch above the top of funnel 10.

As the rolling compound passes through the lower opening 11 in the funnel 10, it forms a pile 20 on the paper 18. The pile 20 resembles an inverted cone having a circular base. The rolling compound is introduced into the funnel 10 until the pile 20 reaches the opening 11 such that the rolling compound will no longer flow through the opening 11.

When the rolling compound will no longer flow through the opening 11, a sharp pencil is used to trace the outline of the base of the pile 20. The rolling compound is removed from the paper, and the diameter of the traced outline is measured three times to obtain an average reading. The angle of repose, θ, is obtained from the following equation.

$$\tan(\theta) = h/r$$

where h=the height of the conical pile, and r=the radius of the conical pile.

It is generally accepted that materials having an angle of repose less than 40° are free flowing. A reasonable classification of angles of repose could be set up as follows:

| Rating | Angle of Repose (Degrees) |
| --- | --- |
| Excellent | 25–30 (or less) |
| Good | 31–35 |
| Fair | 36–40 |
| Passable | 41–45 |
| Poor | 46–55 |
| Very Poor | 56–65 |
| Extremely Poor | 66–90 |

The angle of repose was taken for fifteen proposed rolling compounds using the apparatus of FIG. 1 and as described above. The composition of those proposed rolling compounds and the angle of repose for each are listed in Table 1 below.

TABLE 1

| Proposed Rolling Compound | Powder Composition | Angle of Repose |
| --- | --- | --- |
| 1 | Erythritol-93%/Talc-7% | 22.2 |
| 2 | Erythritol-70%/Mannitol-23%/Talc-7% | 24.5 |
| 3 | Erythritol-46.5%/Mannitol-46.5%/Talc-7% | 25.4 |
| 4 | Erythritol-46.5%/Lactitol-46.5%/Talc-7% | 26 |
| 5 | Erythritol-23.25%/Mannitol-69.75%/Talc-7% | 27.2 |
| 6 | Erythritol-46.5%/Xylitol-46.5%/Talc-7% | 28.6 |
| 7 | Erythritol-46.5%/Maltitol-46.5%/Talc-7% | 30.9 |
| 8 | Maltitol-93%/Talc-7% | 32.2 |
| 9 | Lactitol 100% | 32.6 |
| 10 | Sucrose 100% | 32.8 |
| 11 | Maltitol 100% | 34.4 |
| 12 | Erythritol 100% | 35 |
| 13 | Mannitol 100% | 38.1 |
| 14 | Xylitol 100% | 44.3 |
| 15 | Mannitol-93%/Talc-7% | 28.6[1] |

[1]U.S. Pat. No. 5,206,042 reports an angle of repose for a blend of 93% mannitol and 7% talc to be about 39°, which was reported to indicate very good flow. Even though U.S. Pat. No. 5,206,042 and the present application are commonly assigned, the reason for the difference between the values reported earlier and herein for the angle of repose for this composition is not known. As with all historical data, it is sometimes difficult to reproduce tests and procedures. Also, it is not known if the materials tested were different in some aspect, such as their particle size or moisture

TABLE 1-continued content, or if the tests were carried out using the same equipment and procedures.

It appears that the diameter of the opening at the bottom of funnel 10 used for the present tests differed from the diameter of the opening in the funnel used previously. This diameter may be significant, since the radius of the pile will in part be dependent on the size of that diameter. For purposes of the claims herein, the angle of repose should be determined using a funnel with a bottom opening diameter of 2.5 cm placed one inch above the collection surface.

The interesting fact to note is that, based on the results reported in U.S. Pat. No. 5,206,042, the 93% mannitol/7% talc blend had very good flowability compared to other materials tested. From Table 1, it is seen that even though the angle of repose is different, once again the reported angle of repose for this blend is very good compared to some of the other materials tested.

From Table 1 it can be seen that proposed rolling compound #12, which was 100% erythritol in its normal form, had an angle of repose of 35°. While this value is considered good, it is not as commercially acceptable as many of the proposed rolling compounds. For example, the first seven proposed rolling compounds, which all included erythritol and talc, had angles of repose of about 30° or less. Thus these proposed rolling compounds were more favorable, and thus better suited for use as commercial rolling compounds.

A sieve analysis was conducted to determine the particle size on two of the materials used in the compounds of Table 1, namely the erythritol as supplied by Mitsubishi (used in compound Nos. 1–7 and 12) and xylitol as supplied by American Xyrofin Incorporated (used in compound Nos. 6 and 14). The sieve sizes (U.S. standard) and percent remaining on the sieve are reported in Table 2 below.

TABLE 2

| U.S. Standard Sieve Size | Percent Remaining on Sieve | |
|---|---|---|
| | Erythritol | Xylitol |
| 50 | 3.03 | 2.08 |
| 100 | 24.75 | 5.36 |
| 140 | 13.30 | 5.54 |
| 200 | 13.63 | 9.52 |
| Pan | 45.29 | 77.50 |

It is expected that the angle of repose will be effected by the particle size, with larger particles contributing to a smaller angle of repose, and, as reported in U.S. Pat. No. 5,206,042, uniformity in particle size contributing to flowability. Even with uniform particle sizes, however, as the particles size increases, the material becomes less suitable as a rolling compound because it produces a gritty mouth feel. Preferable the rolling compound will have a particle size distribution such that not more than about 5% of the rolling compound has a particle size larger than a U.S. Standard No. 50 sieve.

Several of the proposed rolling compounds were placed in a controlled environment with 79% relative humidity (RH) to determine their hygroscopicity. The samples were weighed several times over a period of 32 days. The results are shown in FIG. 2.

Figure 2:
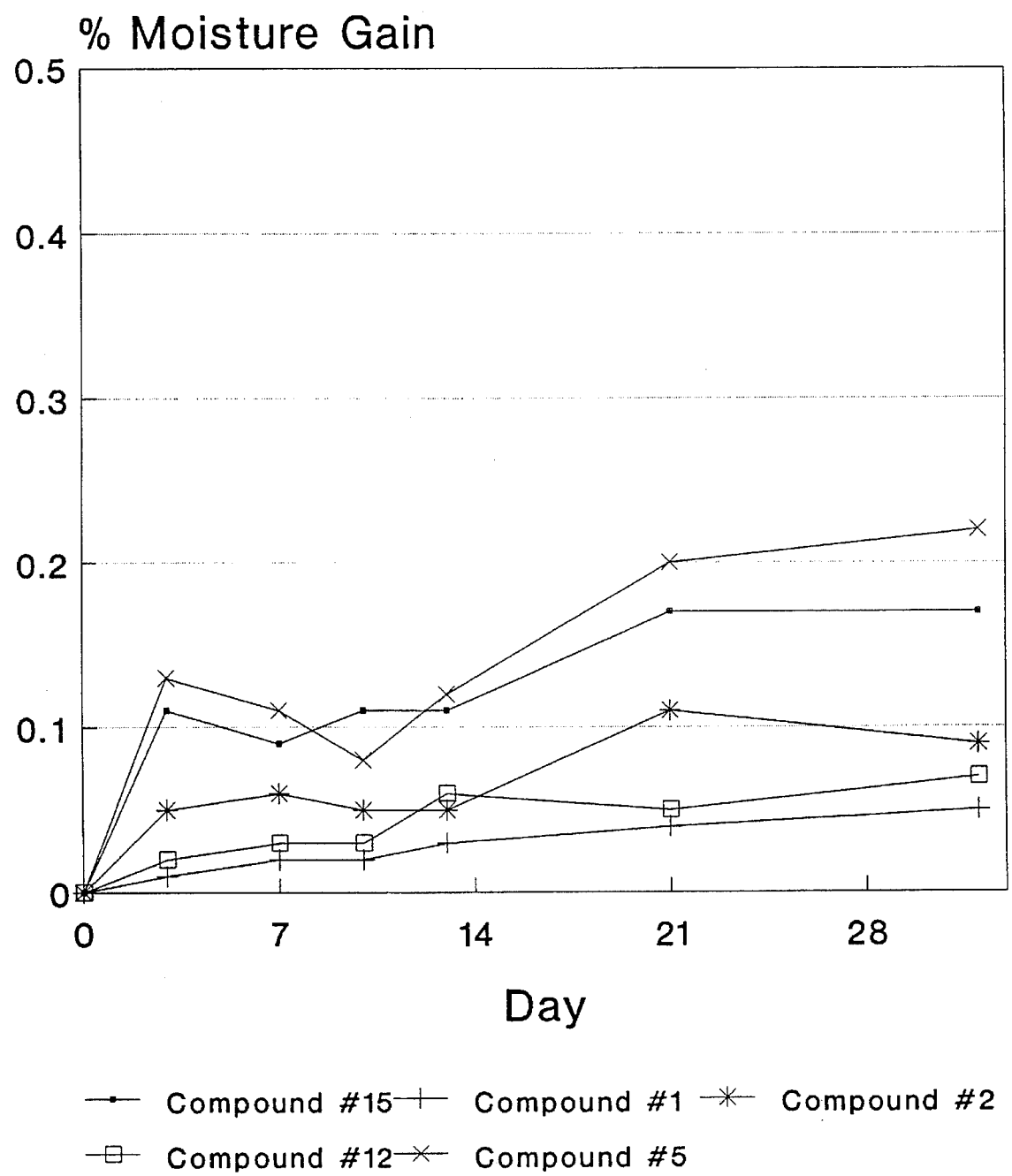
FIG. 2 is a graph showing the moisture gain of various rolling compounds when stored at 79% relative humidity.

As seen in FIG. 2, compounds #1 and #2, which contained 93% and 70% erythritol, respectively, mixed with 7% talc, and compound #12, which was 100% erythritol, had a moisture gain of about 0.1% or less after 32 days of storage. This moisture gain was lower than the rolling compounds that did not contain erythritol, or contained lower amounts of erythritol. Surprisingly, the moisture gain of the erythritol/talc compound was lower than that of the mannitol/talc compound.

The low moisture gain is an important criteria for the suitability of the compounds containing erythritol as rolling compounds.

Chewing gum products of the present invention use erythritol in the rolling compound, but may be made with a variety of chewing gum compositions.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The chewing gum compositions of the present invention follow the general pattern outlined above. They may be made with erythritol as an ingredient in the bulk portion.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between 10% and 50% of the gum and most preferably about 20% to about 30% of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolyzate, corn syrup and combinations thereof may be used as softeners and binding agents in gum.

As mentioned above, the erythritol rolling compound of the present invention will most commonly be used on sugar-free gum formulations. However, sugar-gum formulations may also use a rolling compound comprising erythritol. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, xylitol, hydrogenated starch hydrolyzate, maltitol and the like, alone or in any combination.

Depending on the particular sweetness release profile and shelf-stability needed, coated or uncoated high-intensity sweeteners may be used in the chewing gum composition. High intensity sweeteners, preferably aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame is preferred when aspartame is used to sweeten the gum.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition or added as part of the gum base.

Aqueous syrups, such as corn syrup and hydrogenated corn syrup may be used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolyzate solids and glycerin. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form, such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor is typically added with the final portion of the bulking agent. Other optional ingredients are added in the batch in a typical fashion, well known to those of ordinary skill in the art. It is conventional to cool the gum prior to wrapping, so as to make the gum more manageable.

A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored.

The rolling compound comprises erythritol that has been modified so that it has an angle of repose of 30° or less. Most commonly this will be the result of mixing an anticaking agent, such as talc, with the erythritol. In addition, one or more of the polyols selected from the group consisting of lactitol, maltitol, mannitol and xylitol may also be added to the rolling compound. The amount of erythritol sweetener used in the rolling compound is preferably 40% to about 95% of the rolling compound, and most preferably about 90% to about 95%.

The level of anticaking agent in the rolling compound will usually be in the range of about 0.5% to about 10%, preferably about 3% to about 8%, and more preferably about 5% to about 7% of the rolling compound. While talc is the preferred anticaking agent, other materials that provide a desiccant function may also be used, such as magnesium carbonate and calcium carbonate.

When an additional polyol is used, it will generally be used in the range of about 4.5% to about 50%, preferably about 15% to about 40%, and most preferably about 20% to about 25% of the rolling compound.

The rolling compound is generally used at a level of between 0.25% to about 10.0%, but preferably about 1% to about 3% of the total chewing gum product.

EXAMPLES

A chewing gum composition was prepared using the following sugarless gum formula.

| Ingredients | Weight Percent |
| --- | --- |
| Sorbitol | 45.741% |
| Gum Base | 26.42 |
| Coevaporated Lycasin/Glycerin* | 9.20 |
| Glycerin | 8.56 |
| Mannitol | 8.00 |
| Encapsulated Aspartame | 0.215 |
| Lecithin | 0.130 |
| 10% NaCl Solution | 0.080 |
| Color | 0.024 |
| Spearmint Flavor | 1.630 |

*Lycasin brand hydrogenated starch hydrolyzate syrup was used. The coevaporated Lycasin/glycerin contained 67.5% hydrogenated starch hydrolyzate solids, 25% glycerin and 7.5% water.

The gum composition was formed into sticks weighing about 2.7 grams each using different rolling compounds, as specified below in Table 3. In each example, the rolling compound was applied at a rate of about 3% of the final product weight.

TABLE 3

| Example | Rolling Compound No. | Rolling Compound Composition |
| --- | --- | --- |
| Comparative Example A | 15 | 93% mannitol/7% talc |
| Example 1 | 6 | 46.5% erythritol/46.5% |

TABLE 3-continued

| Example | Rolling Compound No. | Rolling Compound Composition |
| --- | --- | --- |
| Example 2 | 7 | xylitol/7% talc 46.5% erythritol/46.5% maltitol/7% talc |
| Example 3 | 4 | 46.5% erythritol/46.5% lactitol/7% talc |
| Example 4 | 1 | 93% erythritol/7% talc |

Figure 3:
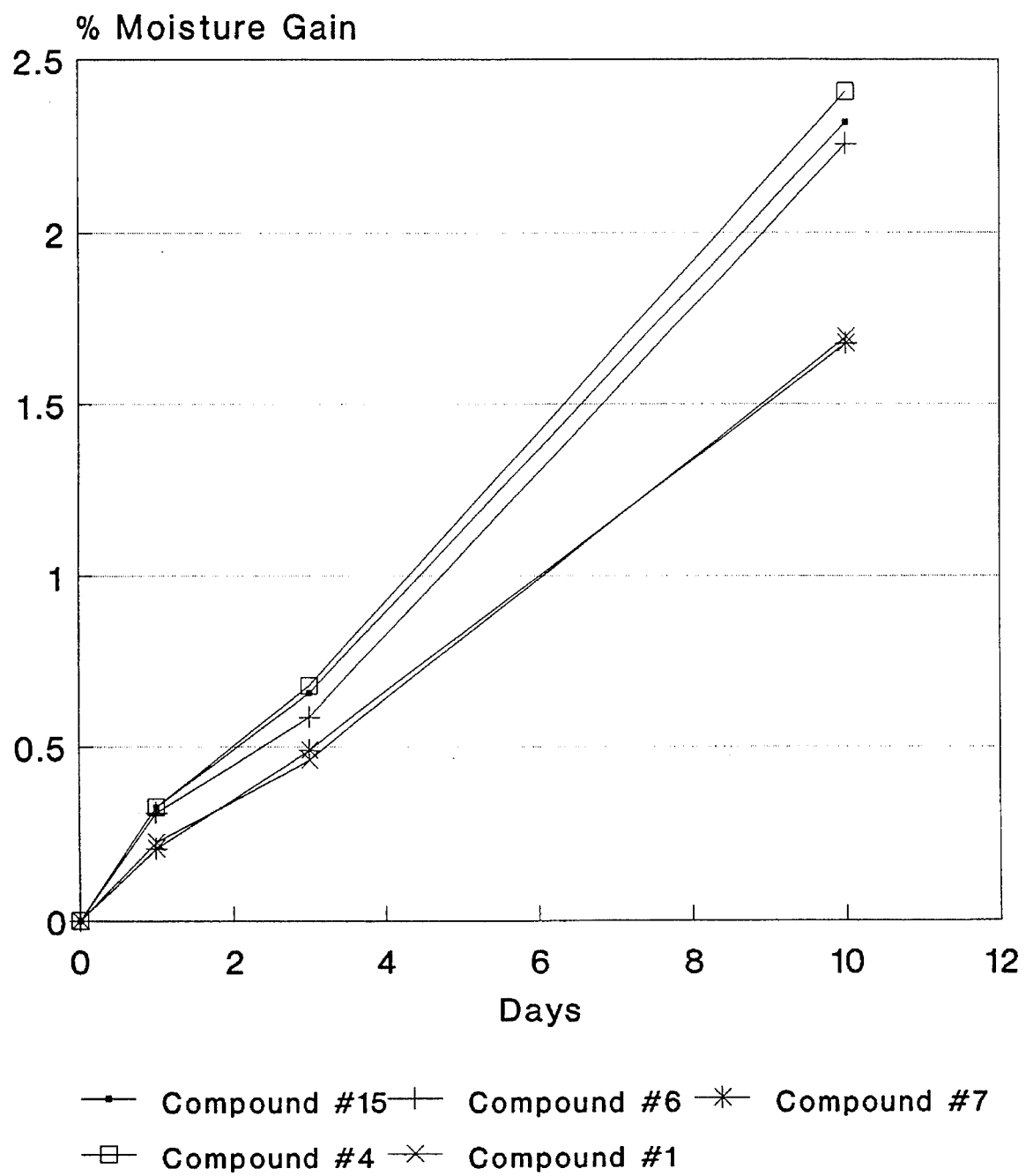
FIG. 3 is a graph showing the moisture gain of gum samples that have various rolling compounds thereon when stored at 79% relative humidity.

Samples of each of the Example products were stored at 79% relative humidity and tested at 1, 3 and 10 days for moisture gain. The results of the test are shown in FIG. 3. Each of the Example 1–4 samples picked up about the same or less moisture than the sample of Comparative Example A, which used mannitol and talc. Thus, the rolling compounds of the invention, in addition to using erythritol and having an angle of repose of less than 30°, also provided a rolling compound that helps keep sugarless gum from picking up too much moisture.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

It should be appreciated that the compositions and methods of the present invention are capable of being incorporated in the form of a variety of embodiments, only a few of which have been illustrated and described above. The invention may be embodied in other forms without departing from its spirit or essential characteristics. For example, it may be possible to treat the erythritol to drying operations, recrystallization operations or other treatments that will change its angle of repose to less than 30°. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum product having a core portion comprising chewable gum base, sweetener and flavoring and further having on the surface of said core portion a powdered rolling compound comprising about 40% to about 95% erythritol and about 3% to about 8% anticaking agent.

2. The chewing gum product of claim 1 wherein the anticaking agent is selected from the group consisting of talc, magnesium carbonate, calcium carbonate and mixtures thereof.

3. The chewing gum product of claim 1 wherein the rolling compound further comprises a polyol selected from the group consisting of maltitol, lactitol, mannitol, xylitol and mixtures thereof.

4. The chewing gum product of claim 1 wherein the rolling compound comprises between about 1% and about 3% of the chewing gum product.

5. The chewing gum product of claim 1 wherein the rolling compound has a particle size distribution such that not more than about 5% of the particles are retained on a U.S. Standard No. 50 sieve.

6. The chewing gum product of claim 3 wherein the polyol comprises between about 4.5% and about 50% of the rolling compound.

7. The chewing gum product of claim 3 wherein the polyol comprises mannitol.

8. The chewing gum product of claim 1 wherein the anticaking agent comprises talc.

9. The chewing gum product of claim 1 wherein the anticaking agent comprises about 5% to about 7% of the rolling compound.

10. A method of producing a chewing gum product comprising the steps of:

a) producing a chewing gum composition comprising chewable gum base, sweetener and flavoring;

b) providing a rolling compound comprising about 40% to about 95% erythritol and about 3% to about 8% anticaking agent; and c) shaping portions of said chewing gum composition into gum pieces while using said rolling compound to coat the surface of said gum pieces.

11. The method of claim 10 wherein the rolling compound is applied to the chewing gum composition at a level of about 1% to about 3% of the chewing gum product.

12. The method of claim 10 wherein the rolling compound has an angle of repose of about 30° or less.

13. The method of claim 10 wherein the chewing gum is formed into sticks by rolling the gum composition into sheets and cutting the sheets into sticks.

14. The method of claim 10 wherein the rolling compound further comprises a polyol selected from the group consisting of maltitol, lactitol, mannitol, xylitol and mixtures thereof.

15. The method of claim 10 wherein the anticaking agent comprises about 5% to about 7% of the rolling compound.

16. A chewing gum product having a core portion comprising chewable gum base, sweetener and flavoring and further having on the surface of said core portion a powdered rolling compound comprising about 40% to about 95% erythritol treated so as to also contain about 3% to about 8% of an anticaking agent so that the rolling compound has an angle of repose of about 30° or less.

17. The product of claim 16 wherein the erythritol is treated by mixing talc therewith.

18. The product of claim 16 wherein the rolling compound is of a nature that when stored in a desiccator at 79% relative humidity, it picks up less than about 0.1% moisture in 32 days of storage.

19. The product of claim 16 wherein the core portion is a sugar-free chewing gum composition.

20. The chewing gum product of claim 16 wherein the anticaking agent comprises about 5% to about 7% of the rolling compound.

* * * * *

UNITED STATES PATENT AND TRADEMARK OFFICE
CERTIFICATE OF CORRECTION

PATENT NO. : 5,494,685
DATED : February 27, 1996
INVENTOR(S) : Henry T. Tyrpin et al.

It is certified that error appears in the above-indentified patent and that said Letters Patent is hereby corrected as shown below:

On the Title Page

In column 1, line 15, delete "[63] Continuation in part of PCT/US93/09354, Sep. 30, 1993." and substitute --[30] Foreign Application Priority Data Sep. 30, 1993 [PCT].....PCT/US93/09354--.

Cross Reference to Related Application

Delete the entire section.

Detailed Description of the Invention and Preferred Embodiments

In column 3, add a new paragraph between lines 22 and 23 as follows: --PCT Application Serial No. PCT/US93/09354, filed September 30, 1993, designating the United States, published as WO 95/08925, is hereby incorporated by reference.--

Signed and Sealed this

Twenty-eighth Day of October, 1997

Attest:

BRUCE LEHMAN

*Attesting Officer*    Commissioner of Patents and Trademarks